(12) United States Patent
Horiuchi et al.

(10) Patent No.: US 11,624,526 B2
(45) Date of Patent: Apr. 11, 2023

(54) HEAT EXCHANGER AND WATER HEATING DEVICE INCLUDING THE SAME

(71) Applicant: NORITZ CORPORATION, Hyogo (JP)

(72) Inventors: Kengo Horiuchi, Hyogo (JP); Takeshi Ohigashi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 51 days.

(21) Appl. No.: 17/177,206

(22) Filed: Feb. 17, 2021

(65) Prior Publication Data

US 2021/0262697 A1 Aug. 26, 2021

(30) Foreign Application Priority Data

Feb. 26, 2020 (JP) .............................. JP2020-030639

(51) Int. Cl.
  *F28D 21/00* (2006.01)
  *F24H 1/41* (2022.01)
  *F28D 1/047* (2006.01)

(52) U.S. Cl.
  CPC ........... *F24H 1/41* (2013.01); *F28D 21/0007* (2013.01); *F28D 1/0477* (2013.01)

(58) Field of Classification Search
  CPC .............. F24H 1/41; F24H 8/006; F24H 8/00; F24H 1/14; F28D 21/0007; F28D 7/087; F28D 7/085; F28D 7/082; F28D 1/047; F28D 7/1638; F28D 1/0477; F28D 7/08; F28F 2210/04; F28F 2210/08; F24D 2200/046

USPC .......................................................... 122/355
See application file for complete search history.

(56) References Cited

U.S. PATENT DOCUMENTS

| | | | | |
|---|---|---|---|---|
| 4,989,781 A | * | 2/1991 | Guyer | F28D 21/0007 237/56 |
| 6,820,685 B1 | * | 11/2004 | Carter | F28D 1/0477 165/150 |
| 7,779,898 B2 | * | 8/2010 | Morrison | F28D 5/02 165/172 |
| 10,948,236 B2 | * | 3/2021 | Ohigashi | F28D 1/0477 |
| 2013/0227946 A1 | * | 9/2013 | Bausch | F28D 1/0477 165/175 |

(Continued)

FOREIGN PATENT DOCUMENTS

| | | | | |
|---|---|---|---|---|
| EP | 687870 A1 | * | 12/1995 | ............... F24H 1/40 |
| GB | 2105834 A | * | 3/1983 | ......... F28D 21/0007 |

(Continued)

*Primary Examiner* — Steven S Anderson, II
*Assistant Examiner* — Andrew W Cheung
(74) *Attorney, Agent, or Firm* — JCIPRNET

(57) ABSTRACT

A heat exchanger includes: a casing into which heating gas is supplied; and a plurality of heat transfer tubes which are arranged in the casing, wherein the plurality of heat transfer tubes are set in a posture in which a plurality of straight tube portions are arranged in a direction intersecting a heating gas flow direction, are stacked a plurality of stages in the heating gas flow direction, and are distinguished into first and second heat transfer tubes respectively located on an upstream side and a downstream side in the heating gas flow direction, and wherein the second heat transfer tube is formed so that an outer diameter of the tube and an arrangement pitch of the plurality of straight tube portions are smaller than those of the first heat transfer tube.

7 Claims, 8 Drawing Sheets

(56) References Cited

U.S. PATENT DOCUMENTS

| | | | |
|---|---|---|---|
| 2016/0377348 A1* | 12/2016 | Endo | F28F 9/001 |
| | | | 165/175 |
| 2019/0003739 A1* | 1/2019 | Aoki | F24H 8/00 |
| 2021/0310741 A1* | 10/2021 | Fujisawa | F24H 1/40 |

FOREIGN PATENT DOCUMENTS

| | | | | | |
|---|---|---|---|---|---|
| JP | H09250816 | A | * | 3/1996 | ............... F24H 9/00 |
| JP | H9250816 | A | * | 9/1997 | |
| JP | H09250816 | A | * | 9/1997 | |
| JP | 2003021390 | A | * | 1/2003 | |
| JP | 2007170733 | | | 7/2007 | |

\* cited by examiner

HEAT EXCHANGER AND WATER HEATING DEVICE INCLUDING THE SAME

CROSS-REFERENCE TO RELATED APPLICATION

This application claims the priority benefit of Japan application serial no. 2020-030639, filed on Feb. 26, 2020. The entirety of the above-mentioned patent application is hereby incorporated by reference herein and made a part of this specification.

BACKGROUND

Technical Field

The disclosure relates to a heat exchanger that recovers heat from heating gas such as combustion gas using a heat transfer tube and a water heating device such as a hot water supply device including the same.

Description of Related Art

As a specific example of a water heating device, one described in Patent Document 1 (Japanese Patent Laid-Open No. 2007-170733) is known.

The water heating device described in the same patent document includes a burner and a heat exchanger and the heat exchanger includes a casing into which combustion gas generated by the burner is supplied and a plurality of heat transfer tubes which are arranged in the casing. As the plurality of heat transfer tubes, there are heat transfer tubes for recovering sensible heat and latent heat and meandering tubes are used as the heat transfer tubes for recovering latent heat. Since the meandering tubes are formed by connecting a plurality of straight tube portions in series through a plurality of curved tube portions, it is preferable to increase a heat transfer area (surface area) for absorbing heat from combustion gas while decreasing the number of meandering tubes.

However, in the related art, there is the following room for improvement.

That is, it is required to contrive a heat exchanger capable of further improving heat exchange efficiency while realizing overall miniaturization and cost reduction. In contrast, conventionally, the plurality of heat transfer tubes (meandering tubes) are set to a posture in which a plurality of straight tube portions are arranged in a combustion gas flow direction and are arranged side by side in a plurality of stages in a direction intersecting the combustion gas flow direction. Thus, a means for increasing the size of the heat transfer tube or the number of the heat transfer tubes needs to be adopted in order to increase a heat recovery amount by the plurality of heat transfer tubes to improve the heat exchange efficiency. Incidentally, when such a means is adopted, the heat exchanger increases in size and cost as a whole.

The disclosure is to provide a heat exchanger capable of appropriately improving heat exchange efficiency while realizing overall miniaturization and cost reduction and a water heating device including the same.

The following technical measures are taken in the disclosure.

SUMMARY

A heat exchanger according to a first aspect of the disclosure includes: a casing into which heating gas is supplied; and a plurality of heat transfer tubes which are arranged in the casing and are configured as meandering tubes in which a plurality of straight tube portions arranged to be separated from each other are integrally connected to each other through a plurality of curved tube portions, wherein the plurality of heat transfer tubes are set in a posture in which the plurality of straight tube portions are arranged in a direction intersecting a heating gas flow direction, are stacked in a plurality of stages in the heating gas flow direction, and are classified as first and second heat transfer tubes respectively located on an upstream side and a downstream side in the heating gas flow direction, and wherein the second heat transfer tube is formed so that an outer diameter of the tube and an arrangement pitch of the plurality of straight tube portions are smaller than those of the first heat transfer tube.

A water heating device according to a second aspect of the disclosure includes: the heat exchanger according to the first aspect of the disclosure; and a heating gas supply unit which supplies heating gas to the heat exchanger.

DESCRIPTION OF THE EMBODIMENTS

Figure 1:
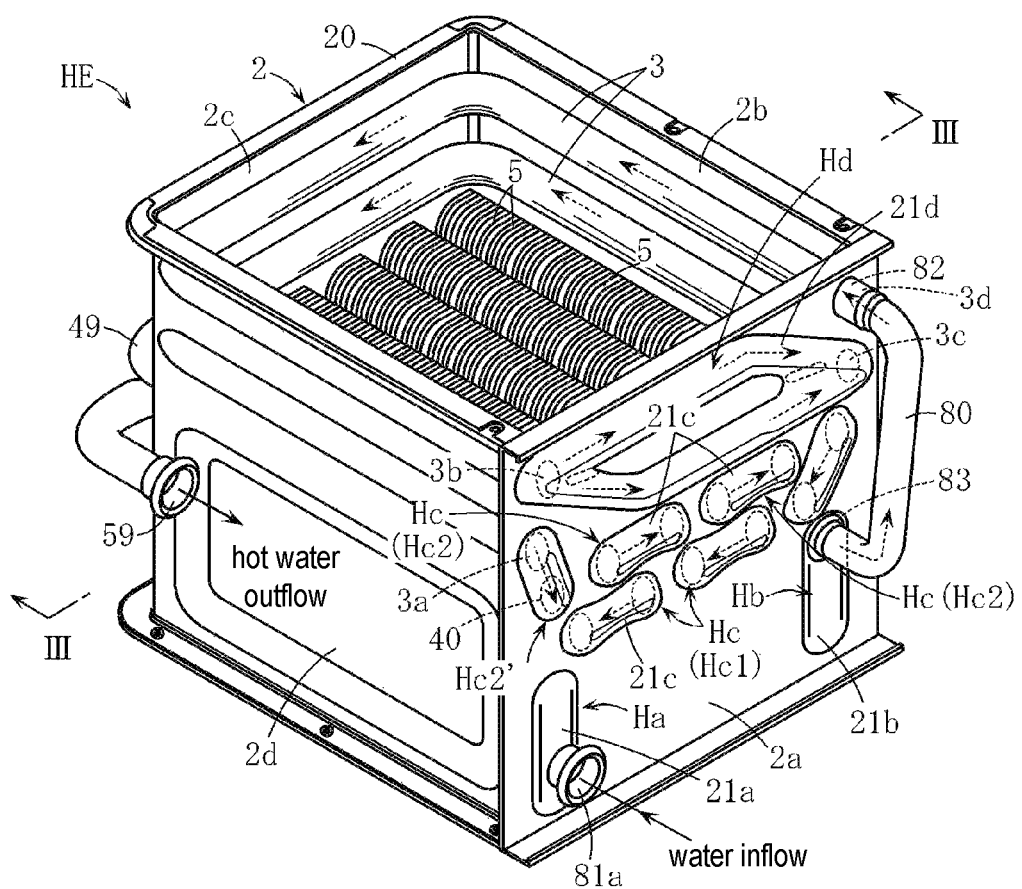
FIG. 1 is a perspective view showing an example of a heat exchanger according to the disclosure.

A heat exchanger according to a first aspect of the disclosure includes: a casing into which heating gas is supplied; and a plurality of heat transfer tubes which are arranged in the casing and are configured as meandering tubes in which a plurality of straight tube portions arranged to be separated from each other are integrally connected to each other through a plurality of curved tube portions, wherein the plurality of heat transfer tubes are set in a posture in which the plurality of straight tube portions are arranged in a direction intersecting a heating gas flow direction, are stacked in a plurality of stages in the heating gas flow direction, and are classified as first and second heat transfer tubes respectively located on an upstream side and a downstream side in the heating gas flow direction, and wherein the second heat transfer tube is formed so that an outer diameter of the tube and an arrangement pitch of the plurality of straight tube portions are smaller than those of the first heat transfer tube.

Further, according to an exemplary embodiment of the disclosure, each of the first and second heat transfer tubes are provided to be stacked in a plurality of stages in the heating gas flow direction and the adjacent heat transfer tubes in the heating gas flow direction are displaced in a direction intersecting the heating gas flow direction.

Further, according to an exemplary embodiment of the disclosure, in the heat exchanger according to the disclosure, a pair of header portions each having chambers communicating with the inside of both end portions of each of the first and second heat transfer tubes are provided as a means for inflow and outflow of a fluid to be heated to and from the first and second heat transfer tubes and the pair of header portions serve as a header portion for the first heat transfer tube and a header portion for the second heat transfer tube.

Further, according to an exemplary embodiment of the disclosure, pitches between both end portions of each of the first and second heat transfer tubes are the same.

Further, according to an exemplary embodiment of the disclosure, the heat exchanger according to the disclosure further includes: a primary heat exchange unit which is provided on the upstream side of the first and second heat transfer tubes in the heating gas flow direction in the casing and recovers sensible heat from heating gas and the first and second heat transfer tubes constitute a secondary heat exchange unit which recovers latent heat from heating gas from which the sensible heat is recovered by the primary heat exchange unit.

A water heating device according to a second aspect of the disclosure includes: the heat exchanger according to the first aspect of the disclosure; and a heating gas supply unit which supplies heating gas to the heat exchanger.

Further, according to an exemplary embodiment of the disclosure, the heating gas supply unit includes a burner which generates combustion gas as heating gas and a fan which advances the combustion gas to the heat exchanger.

Other exemplary embodiments of the disclosure will become more apparent from the following description of embodiments of the disclosure with reference to the accompanying drawings.

Hereinafter, exemplary embodiments of the disclosure will be described in detail with reference to the drawings.

Figure 3:
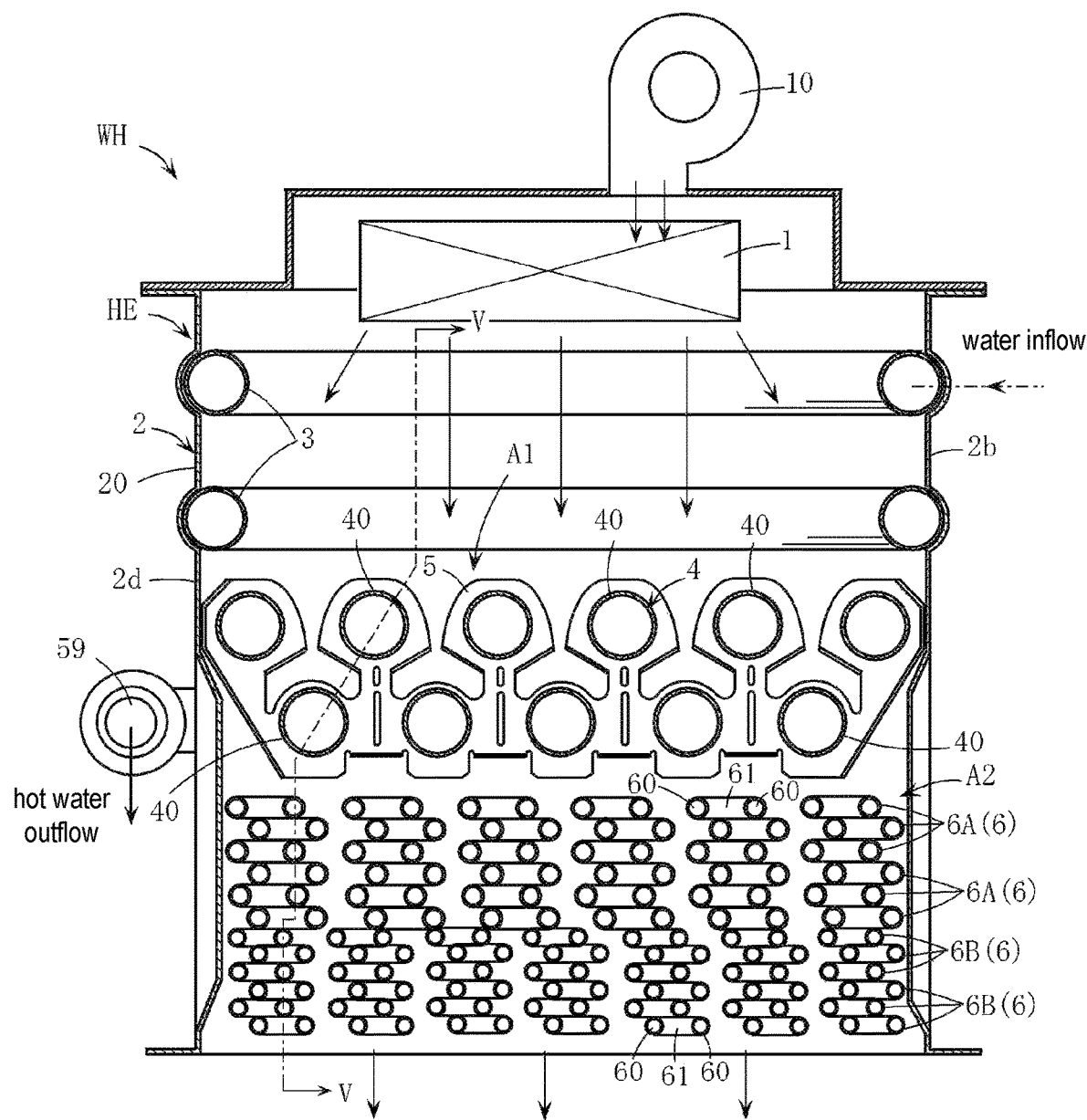
FIG. 3 is a cross-sectional view showing an example of a water heating device configured by using the heat exchanger of FIG. 1, where the heat exchanger shown in the same drawing corresponds to a cross-sectional view along a line III-III of FIG. 1.

A water heating device WH shown in FIG. 3 includes a burner 1 which generates combustion gas as heating gas and a heat exchanger HE. The heat exchanger HE includes a casing 2, a plurality of body tubes 3 which are disposed in the casing 2, a primary heat exchange unit A1 which include a plurality of fins 5 and heat transfer tubes 4, a secondary heat exchange unit A2 which includes a plurality of heat transfer tubes 6, and a plurality of header portions Ha to Hd which are shown in FIG. 1.

The plurality of heat transfer tubes 6 of the secondary heat exchange unit A2 are meandering tubes and are portions having a main characteristic configuration of the disclosure. As will be described below, the plurality of heat transfer tubes 6 are classified first and second heat transfer tubes 6A and 6B. Further, the header portions Ha and Hb among the plurality of header portions Ha to Hd are for the secondary heat exchange unit A2.

The burner 1 corresponds to an example of a heating gas supply unit according to the disclosure and is of a conventionally known reverse combustion type. In the burner 1, fuel gas is mixed with combustion air supplied from a fan 10 so that the fuel gas is ignited and combustion gas (heating gas) generated by the ignition is supplied downward into the casing 2 from above. Thus, in this embodiment, the downward direction is the combustion gas flow direction (corresponding to the heating gas flow direction in the disclosure).

Figure 2:
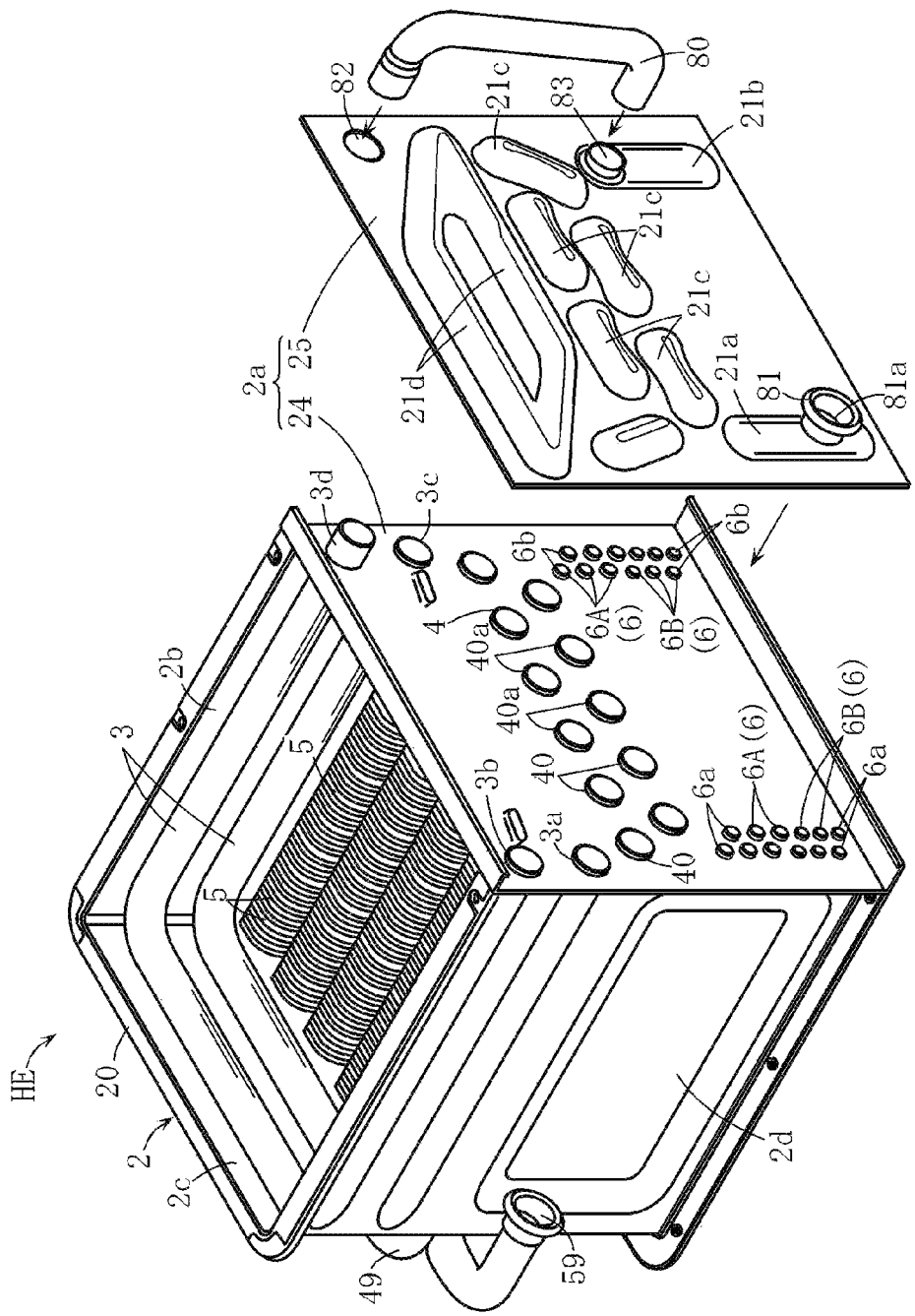
FIG. 2 is an exploded perspective view of FIG. 1.

The body tube 3 is bent in substantially a LI shape and is provided in a plurality of upper and lower stages along upper inner surfaces of side wall portions 2b to 2d of the casing 2 (also see FIGS. 1 and 2). As will be described later, water (corresponding to an example of a fluid to be heated in the disclosure) is supplied and distributed therein. As a result, this water serves to cool upper portions of the plurality of side wall portions 2b to 2d of the casing 2 and also absorbs heat, heating water, from combustion gas. An upper portion of a side wall portion 2a of the casing 2 is cooled by the header portion Hd. The header portion Hd will be described below.

Figure 5:
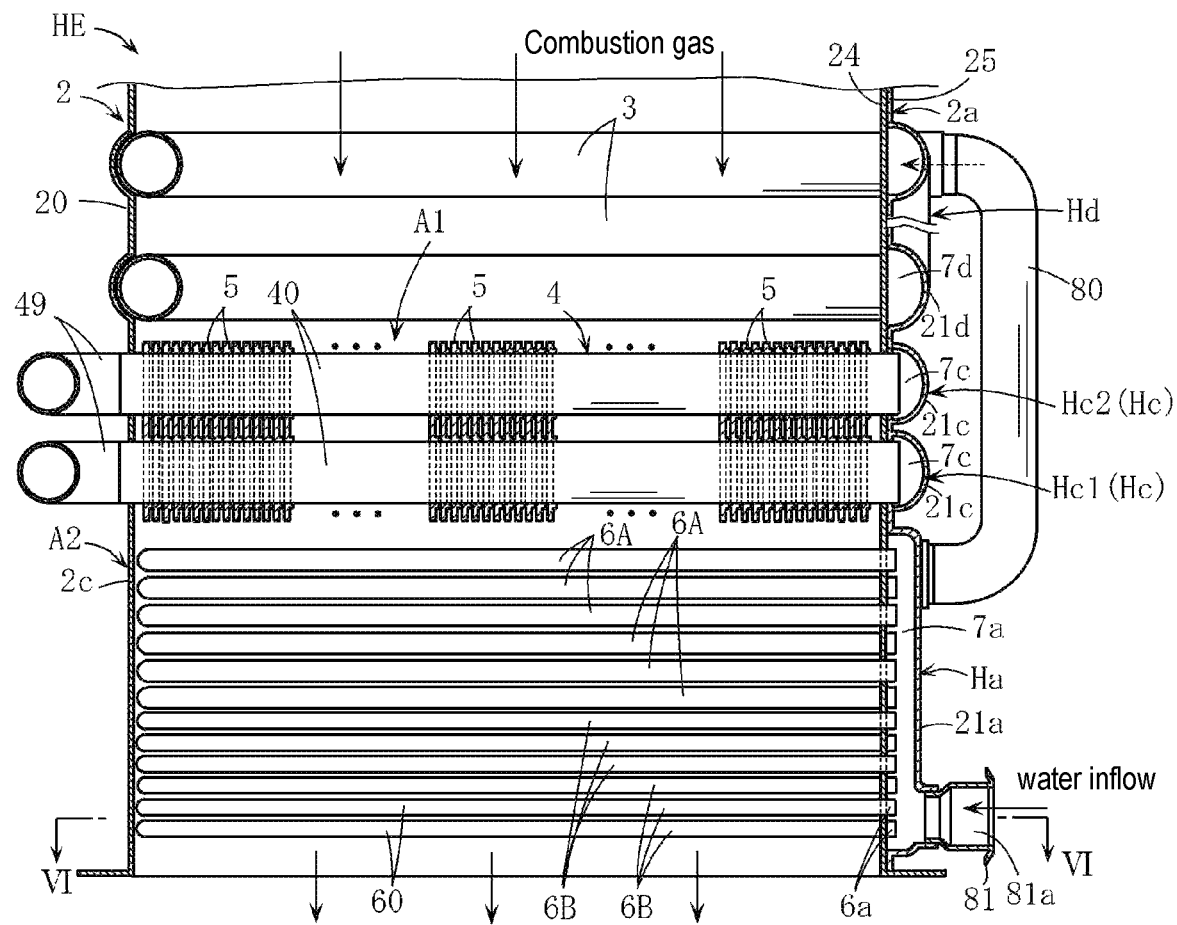
FIG. 5 is a cross-sectional view along a line V-V of FIG. 3.

The primary heat exchange unit A1 is a portion for recovering sensible heat from the combustion gas and is provided at a position lower than the body tube 3. This primary heat exchange unit A1 is of a so-called tube type with fins and includes the plurality of fins 5 and heat transfer tubes 4. The plurality of heat transfer tubes 4 are arranged in the casing 2 to extend in the horizontal direction. Both end portions of each heat transfer tube 4 are supported by the side wall portions 2a and 2c of the casing 2 and are connected in series through bent tubes 49 and the plurality of header portions He (also see FIG. 5). The header portions He will be described below. The plurality of fins 5 have a plate shape arranged in the axial length direction of each heat transfer tube 4 and are joined through the plurality of heat transfer tubes 4.

Figure 7A:
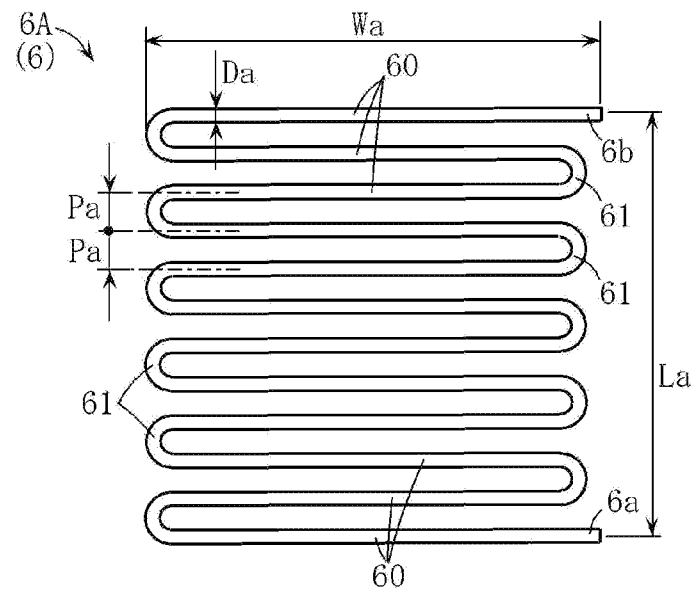
FIG. 7A is a plan view of a first heat transfer tube of the heat exchanger shown in FIGS. 1 to 6 and FIG. 7B is a plan view of a second heat transfer tube.
Figure 7B:
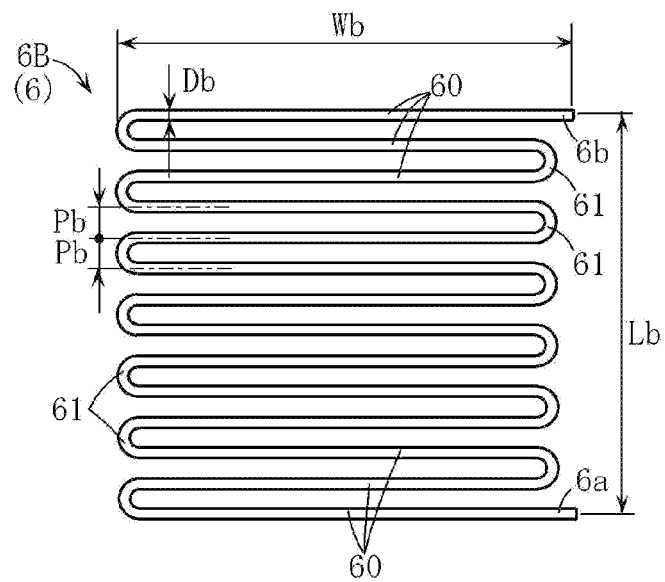

The secondary heat exchange unit A2 is provided below the primary heat exchange unit A1 in the casing 2 and has a configuration in which the plurality of heat transfer tubes 6 are stacked as meandering tubes in the vertical height direction. As the plurality of heat transfer tubes 6, there are two types of the first and second heat transfer tubes 6A and 6B to be described later with reference to FIGS. 7A and 7B. However, both end portions 6a and 6b of these are supported by the side wall portion 2a of the casing 2 and are attached to the header portions Ha and Hb. The configuration of the header portions Ha and Hb will also be described later.

As shown in FIG. 1, the casing 2 has a substantially rectangular tubular shape with both upper and lower sides open. This casing 2 includes a casing body portion 20 which includes the side wall portions 2b to 2d and has substantially a LI shape in the plan view and an inner plate 24 and an outer plate 25 which constitute the side wall portion 2a.

As shown in FIG. 2, the inner plate 24 is joined to the casing body portion 20 to close one side surface opening portion of the casing body portion 20. End portions 3a to 3d of the body tube 3, one end portions 40a of a plurality of tube bodies 40 constituting the heat transfer tubes 4, and both end portions 6a and 6b of the plurality of heat transfer tubes 6 are connected to the inner plate 24 in a penetrating manner. The outer plate 25 is a member for forming the plurality of header portions Ha to Hd by being overlapped by and joined to the outer surface side of the inner plate 24. This outer plate 25 is provided with a plurality of bulging portions 21a to 21d which bulge toward the outside of the casing 2 as the bulging portions constituting the plurality of header portion Ha to Hd shown in FIG. 1.

Figure 6:
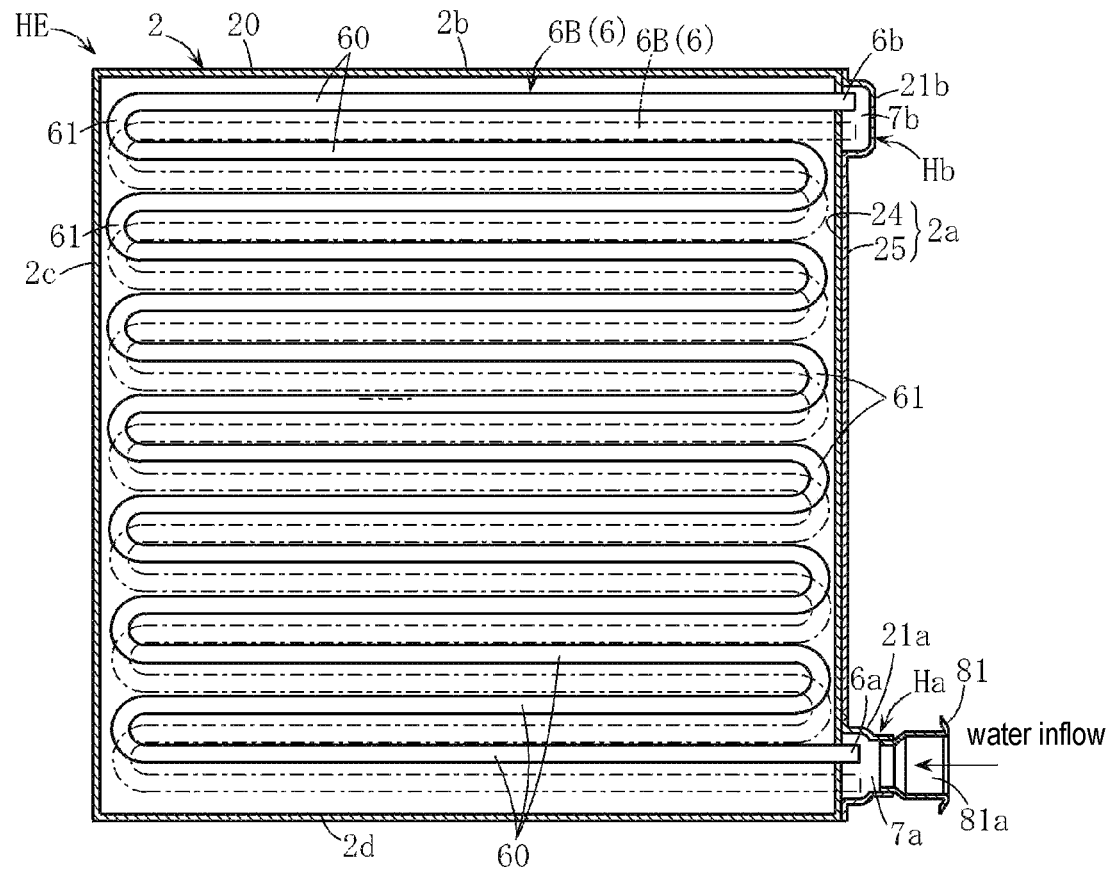
FIG. 6 is a cross-sectional view along a line VI-VI of FIG. 5.

The header portions Ha and Hb are header portions for inflow of water and outflow of hot water to and from the secondary heat exchange unit A2. The header portion Ha for water inflow is a portion in which a chamber 7a (also see FIGS. 5 and 6) is formed by the bulging portion 21a and the inner plate 24. The chamber 7a communicates with the inside of one end portion 6a of each of the plurality of heat transfer tubes 6 (6A, 6B). The header portion Ha is provided with a water inlet 81a and a pipe joint portion 81. The header portion Hb for hot water outflow is a portion in which a chamber 7b (see FIG. 6) is formed by a bulging portion 21b and the inner plate 24. The chamber 7b communicates with the inside of the other end portion 6b of each of the plurality of heat transfer tubes 6 (6A, 6B). The header portion Hb is provided with a hot water outlet 83 to which a connection tube 80 to be described later is connected.

The header portions He (Hc1, Hc2) are header portions which serve as a communication path or a water path allowing the inner portions of the plurality of tube bodies 40 of the heat transfer tubes 4 to communicate with each other. These header portions He are formed by providing the bulging portions 21c in the outer plate 25 and chambers 7c which communicate with the inside of one end portions 40a of the tube bodies 40 are formed therein (also see FIG. 5). However, a header portion Hc2' shown in FIG. 1 is used to allow the inside of one end portion 3a of the body tube 3 at the lower stage to communicate with the tube body 40.

The header portion Hd is a header portion which serves as a communication path allowing one end portion 3b of the body tube 3 at the upper stage to communicate with the other end portion 3c of the body tube 3 at the lower stage. This header portion Hd is formed by providing a bulging portion 21d in the outer plate 25 and a chamber 7d is formed therein (also see FIG. 5). As shown in FIGS. 1 and 2, the middle part of the bulging portion 21d is bifurcated, and this is helpful in improving the cooling effect of the side wall portion 2a due to the header portion Hd by increasing the area of the header portion Hd. The outer plate 25 is also provided with an opening portion 82 to be connected to the upper end of the connection tube 80. This opening portion 82 corresponds to a water inlet for the body tube 3.

In the heat exchanger HE, water such as tap water is supplied to the water inlet 81a. Then, this water advances as indicated by arrows in FIG. 1. That is, the water supplied to the water inlet 81a flows into the header portion Ha, passes through the plurality of heat transfer tubes 6, and reaches the header portion Hb. Then, the water passes through the connection tube 80, flows into the body tubes 3, and flows to the heat transfer tubes 4 after passing through the body tubes 3. At this time, the water flows through the plurality of header portions He or the bent tubes 49 in addition to the tube bodies 40 and finally reaches the hot water outlet 59 of the heat transfer tubes 4 to be thereby hot water outflows. In the above-described flow process of the water, the water is heated by combustion gas to generate hot water.

The configuration of the secondary heat exchange unit A2 will be described below in more detail.

As the plurality of heat transfer tubes 6 constituting the secondary heat exchange unit A2, as described above, as shown in FIGS. 7A and 7B, meandering tubes in which a plurality of straight tube portions 60 arranged to be separated from each other in a predetermined direction are connected in series through a plurality of curved tube portions 61 are used. However, the outer diameter Db of the tube of the second heat transfer tube 6B is smaller than the outer diameter Da of the tube of the first heat transfer tube 6A. Further, the arrangement pitch Pb of the straight tube portions 60 of the second heat transfer tube 6B is smaller than the arrangement pitch Pa of the straight tube portions 60 of the first heat transfer tube 6A. The pitches La and Lb between both end portions are substantially the same and the widths Wa and Wb are also substantially the same. The second heat transfer tube 6B is formed such that the number of the straight tube portions 60 is larger than that of the first heat transfer tube 6A.

The plurality of heat transfer tubes 6 (the first and second heat transfer tubes 6A and 6B) are set in a posture in which the plurality of straight tube portions 60 are arranged in the horizontal direction (a direction intersecting the combustion gas flow direction) and are stacked to be close to each other in the vertical height direction (see FIGS. 3 to 6). However, the plurality of first heat transfer tubes 6A are set to be located at the upper area (the upstream side in the combustion gas flow direction) and the plurality of second heat transfer tubes 6B are set to be located at the lower area.

Figure 4:
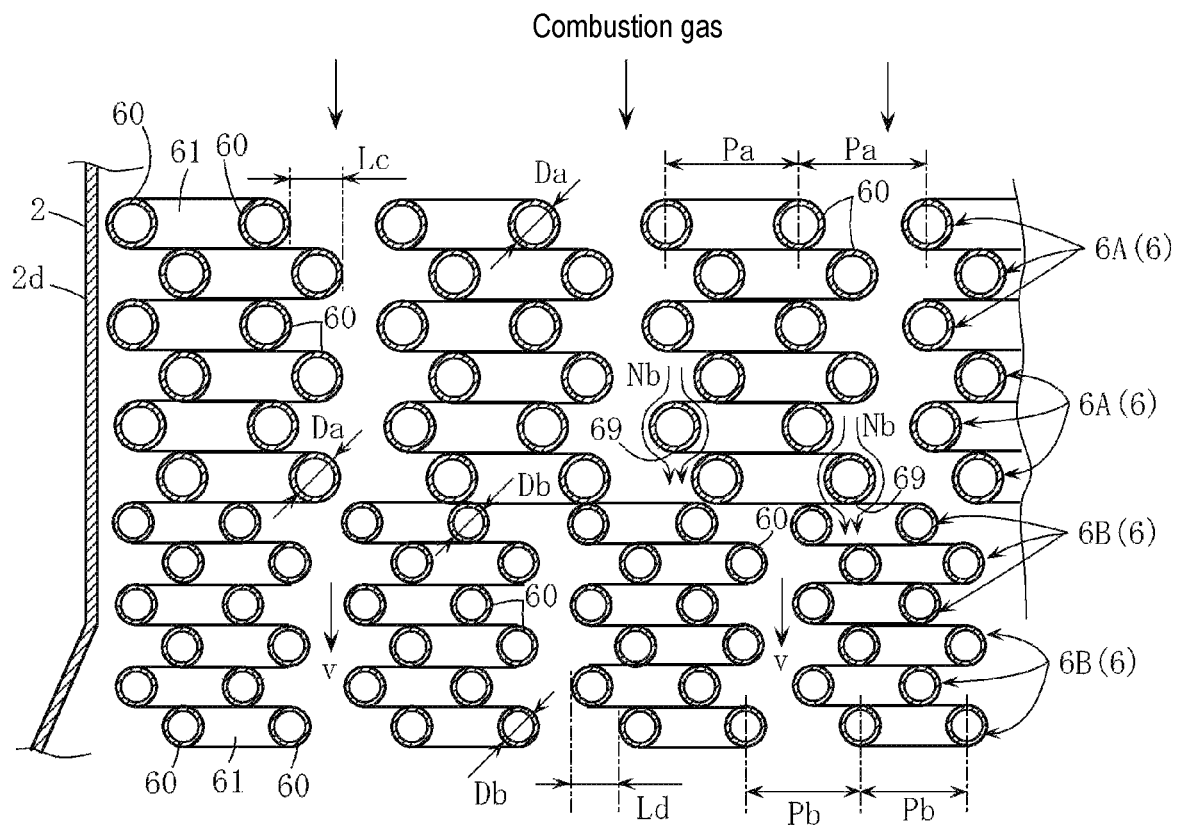
FIG. 4 is a main enlarged cross-sectional view of FIG. 3.

As shown in FIGS. 3 and 4, in the plurality of first and second heat transfer tubes 6A and 6B, the adjacent ones close to each other in the vertical height direction are arranged (for example, in a staggered array) to be displaced from each other by appropriate dimensions Lc and Ld in the horizontal direction.

The arrangement pitches Pa and Pb of the straight tube portions 60 of the first and second heat transfer tubes 6A and 6B are different from each other. For this reason, the straight tube portions 60 of the first and second heat transfer tubes 6A and 6B are displaced from each other in the horizontal direction. That is, the first and second heat transfer tubes 6A and 6B are configured such that a part of the plurality of straight tube portions 60 of the second heat transfer tube 6B is exposed between the plurality of straight tube portions 60 of the first heat transfer tube 6A in the plan view. A member that blocks these portions is not provided between the first and second heat transfer tubes 6A and 6B.

Next, the action of the heat exchanger HE and the water heating device WH including the same will be described.

In the water heating device WH, since sensible heat and latent heat can be recovered from combustion gas by using the heat exchanger HE, the heat recovery amount increases and hence the heat exchange efficiency increases. However, since the following actions can be obtained in the secondary heat exchange unit A2 in addition to the above-described action, the heat exchange efficiency of the entire heat exchanger HE further increases.

That is, in FIG. 4, since the second heat transfer tubes 6B are formed such that the arrangement pitch Pb of the straight tube portions 60 is small and the width of the area between the straight tube portions 60 is small, the flow velocity v when combustion gas passes through the area between the straight tube portions 60 becomes fast. Here, in general, the heat exchange efficiency between combustion gas and the heat transfer tube becomes higher as the flow velocity v of combustion gas becomes faster. Thus, the heat exchange efficiency of the second heat transfer tube 6B is further improved as the flow velocity of combustion gas becomes faster.

Further, in an area provided with the plurality of second heat transfer tubes 6B, the resistance against the flow of combustion gas is larger than that of an area provided with the plurality of first heat transfer tubes 6A. Furthermore, the straight tube portions 60 of the first and second heat transfer tubes 6A and 6B are displaced from each other in the horizontal direction. For this reason, combustion gas acting on the first heat transfer tube 6A is likely to flow over the substantially entire circumference of the outer circumferential surface of the first heat transfer tube 6A as indicated by arrows Nb of FIG. 4.

Figure 8:
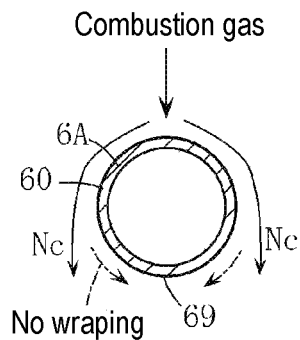
FIG. 8 is an explanatory diagram showing a comparative example of the disclosure.

This point will be described in more detail. FIG. 8 shows a comparative example of this embodiment. In this comparative example, the second heat transfer tube 6B which acts as a resistance against the flow of combustion gas is not provided below the first heat transfer tube 6A. In this comparative example, combustion gas which advances to the first heat transfer tube 6A from above advances to the lower side of the first heat transfer tube 6A without effectively acting on the lower surface portion 69 of the first heat transfer tube 6A as indicated by arrows Nc.

In contrast, in this embodiment shown in FIG. 4, the presence of the second heat transfer tube 6B causes combustion gas to wrap around the lower surface portion 69 of the first heat transfer tube 6A. Thus, in this embodiment, the heat exchange efficiency of the first heat transfer tube 6A can be increased more than the comparative example of FIG. 8.

In this way, according to this embodiment, since the heat exchange efficiency for both the first and second heat transfer tubes 6A and 6B can be increased, the heat exchange efficiency of the water heating device WH can be excellent.

The heat exchanger HE can be decreased in size and cost. That is, in order to increase the heat recovery amount of the secondary heat exchange unit A2, the total heat transfer area of the plurality of heat transfer tubes 6 needs to be increase to some extent. In contrast, since the first heat transfer tube 6A is formed such that the outer diameter Da of the tube is large and the surface area is wide, it is possible to set the entire heat transfer area of the plurality of heat transfer tubes 6 to a certain degree of an area while decreasing the total number by using the first heat transfer tube 6A. For example, when all of the plurality of heat transfer tubes 6 are formed such that the outer diameter of the tube is small, the total number needs to be increased considerably and hence the device increases in size. Further, there is an increase in manufacturing cost such as parts cost and assembling cost to the casing 2. On the other hand, when all of the plurality of heat transfer tubes 6 are formed such that the outer diameter of the tube is large, the above-mentioned effect of increasing the heat exchange efficiency of the secondary heat exchange unit A2 cannot be obtained. Accordingly, since the total number of the heat transfer tubes 6 needs to be increased, an increase in size or manufacturing cost occurs. In contrast, according to this embodiment, such a problem can be eliminated and the size and cost of the secondary heat exchange unit A2 and the heat exchanger HE can be appropriately decreased as a whole.

Both first and second heat transfer tubes 6A and 6B can be manufactured by bending one straight tubular raw material pipe. Here, since the second heat transfer tube 6B is formed such that the arrangement pitch Pb of the straight tube portions 60 is small and the curvature radius of the curved tube portion 61 is small, the bending process for forming the curved tube portion 61 originally becomes difficult. However, in this embodiment, since the second heat transfer tube 6B is formed such that the outer diameter Db of the tube is small, the bending process of forming the curved tube portion 61 is easy. As a result, there is no problem that the manufacturing of the second heat transfer tube 6B is difficult.

Figure 9:
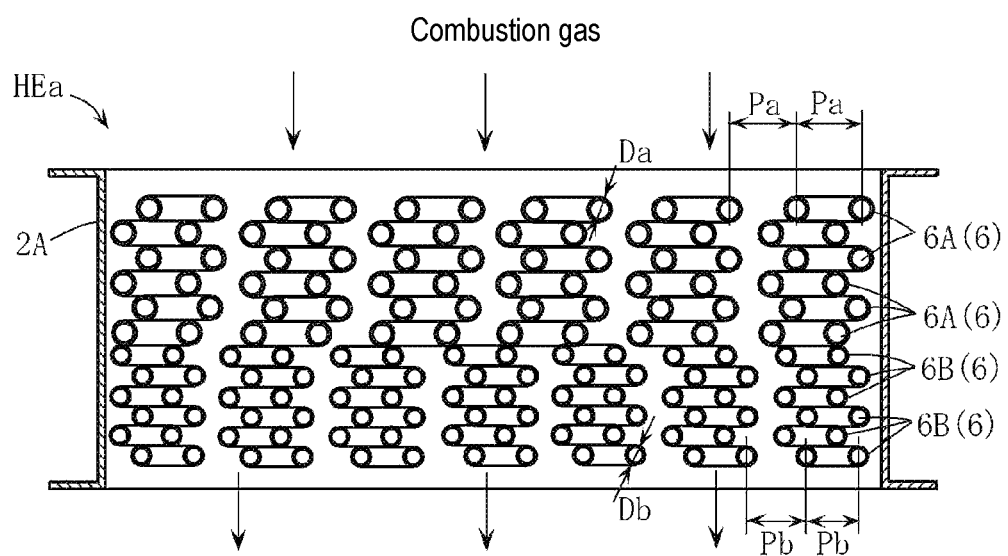
FIG. 9 is a main cross-sectional view showing another example of the disclosure.

FIG. 9 shows another embodiment of the disclosure. In the same drawing, the same reference numerals as those of the above-described embodiment are given to the same or similar components of the above-described embodiment and redundant description will be omitted.

In a heat exchanger HEa shown in FIG. 9, only the plurality of heat transfer tubes 6 (the first and second heat transfer tubes 6A and 6B) corresponding to the secondary heat exchange unit A2 are provided as the plurality of heat transfer tubes provided in a casing 2A. The primary heat exchange unit A1 or the body tube 3 is not provided.

The heat exchanger according to the disclosure can have such a configuration.

The disclosure is not limited to the contents of the above-described embodiment. The specific configuration of each part of the heat exchanger and the water heating device according to the disclosure can be variously redesigned within the scope intended by the disclosure.

Both the first and second heat transfer tubes may be formed as meandering tubes and may have a relative relationship such that the outer diameter of the tube and the arrangement pitch of the straight tube portions of the second heat transfer tube are smaller than those of the first heat transfer tube. The specific sizes of the first and second heat transfer tubes, the number of the straight tube portions or the curved tube portions, and the materials thereof are not limited thereto.

One or more first and second heat transfer tubes need to be provided and the specific number thereof is not limited thereto. In the above-described embodiment, the first and second heat transfer tubes are respectively set to the same number and the number may not be the same and may be different. From the viewpoint of increasing the heat exchange efficiency while decreasing the size as a whole, the number of the first and second heat transfer tubes may be the same or the number of the second heat transfer tubes may be larger than the number of the first heat transfer tubes.

In the above-described embodiment, the reverse combustion type in which heating gas flows downward has been described, but the disclosure is not limited thereto. For example, a normal combustion type in which heating gas flows upward may be adopted or heating gas may flow substantially horizontally. Heating gas is not limited to combustion gas and may be, for example, high-temperature exhaust gas generated in a cogeneration system. The heat exchanger according to the disclosure can also be used for other purposes other than being used as a component of a water heating device. Thus, the fluid to be heated can be a fluid other than water. The water heating device according to the disclosure has a function of heating water to generate hot water and can be configured as, for example, a hot water supply device for bathing, a water heating device for heating, a water heating device for melting snow, or the like other than a general hot water supply device.

What is claimed is:

1. A heat exchanger comprising:
a casing into which heating gas is supplied; and
a plurality of heat transfer tubes which are arranged in the casing and are configured as meandering tubes in which a plurality of straight tube portions arranged to be separated from each other are integrally connected to each other through a plurality of curved tube portions, and the straight tube portions connected to the same curved tube portions are located at a same level height,
wherein the plurality of heat transfer tubes are set in a posture in which the plurality of straight tube portions are arranged in a direction intersecting a heating gas flow direction, are stacked in a plurality of stages in the heating gas flow direction, and are classified as first and second heat transfer tubes respectively located on an upstream side and a downstream side in the heating gas flow direction, and
wherein the second heat transfer tubes are formed so that an outer diameter and an arrangement pitch of the plurality of straight tube portions are smaller than those of the first heat transfer tubes,
pitches between both end portions of each of the first and second heat transfer tubes are the same, and
a number of the straight tube portions and the curved tube portions of the second heat transfer tubes is larger than a number of the straight tube portions and the curved tube portions of the first heat transfer tubes.

2. The heat exchanger according to claim 1,
wherein each of the first and second heat transfer tubes are provided to be stacked in the plurality of stages in the heating gas flow direction and the adjacent first and second heat transfer tubes in the heating gas flow direction are displaced in the direction intersecting the heating gas flow direction.

3. The heat exchanger according to claim 1,
wherein a pair of header portions each having chambers communicating with the inside of both end portions of each of the first and second heat transfer tubes are provided as a means for inflow and outflow of a fluid to be heated to and from the first and second heat transfer tubes, and
wherein the pair of header portions serve as a header portion for the first heat transfer tubes and a header portion for the second heat transfer tubes.

4. The heat exchanger according to claim 1, further comprising:
a primary heat exchange unit which is provided on the upstream side of the first and second heat transfer tubes in the heating gas flow direction in the casing and recovers sensible heat from heating gas,
wherein the first and second heat transfer tubes constitute a secondary heat exchange unit which recovers latent heat from heating gas from which the sensible heat is recovered by the primary heat exchange unit.

5. A water heating device comprising:
the heat exchanger according to claim 1; and
a heating gas supply unit which supplies heating gas to the heat exchanger.

6. The water heating device according to claim 5,
wherein the heating gas supply unit includes a burner which generates combustion gas as heating gas and a fan which advances the combustion gas to the heat exchanger.

7. The heat exchanger according to claim 3,
wherein the pair of header portions are disposed on an outer surface side of a sidewall of the casing and are arranged to be spaced apart from each other along a horizontal direction.

\* \* \* \* \*